(12) United States Patent
Toyofuku (10) Patent No.: US 7,738,016 B2
(45) Date of Patent: Jun. 15, 2010

(54) DIGITAL CAMERA WITH DUAL OPTICAL SYSTEMS

(75) Inventor: Toshiyuki Toyofuku, Tokyo (JP)

(73) Assignee: Eastman Kodak Company, Rochester, NY (US)

( * ) Notice: Subject to any disclaimer, the term of this patent is extended or adjusted under 35 U.S.C. 154(b) by 574 days.

(21) Appl. No.: 11/535,613

(22) Filed: Sep. 27, 2006

(65) Prior Publication Data

US 2007/0182833 A1 Aug. 9, 2007

(30) Foreign Application Priority Data

Feb. 6, 2006 (JP) ............................. 2006-028364

(51) Int. Cl.
- H04N 5/262 (2006.01)
- G03B 17/00 (2006.01)
- G02B 15/14 (2006.01)

(52) U.S. Cl. ............ 348/240.1; 348/240.3; 348/240.99; 396/60; 396/72; 359/676

(58) Field of Classification Search ... 348/240.1–240.3, 348/240.99, 347; 396/60, 72, 85–87; 359/676
See application file for complete search history.

(56) References Cited

U.S. PATENT DOCUMENTS 5,822,625 A * 10/1998 Leidig et al. .................. 396/77
6,757,013 B2 6/2004 Matsuzaka
2003/0020814 A1 * 1/2003 Ono .......................... 348/220.1

FOREIGN PATENT DOCUMENTS

| JP | 10-042183 | 2/1998 |
|----|-----------|--------|
| JP | 2003-283910 | 10/2003 |

\* cited by examiner

*Primary Examiner*—Nhan T Tran
*Assistant Examiner*—Mekonnen Dagnew
(74) *Attorney, Agent, or Firm*—Pamela R. Crocker; Peyton C. Watkins (57) ABSTRACT

A digital camera has a first optical system having a wide zoom lens and a second optical system for a telephotography zoom lens. In an initial state where power is active, a controller and timing-generator controls the wide zoom lens so as to be situated at a wide position and the telephotography zoom lens so as to be situated at a telephotograph position. When zoom-in is effected, the wide zoom lens is actuated, and the telephotography zoom lens is maintained at the telephotograph position. When a zoom position of the wide zoom lens has reached a threshold zoom position set to a wider angle of view than that achieved at the telephotograph position, the telephotography zoom lens starts being actuated toward the wide position. When the zoom lens has reached the telephotograph position, an image signal is switched from the wide zoom lens to the telephotography zoom lens, and the selected image signal is output.

3 Claims, 9 Drawing Sheets

DIGITAL CAMERA WITH DUAL OPTICAL SYSTEMS

CROSS REFERENCE TO RELATED APPLICATIONS

This application claims priority to Japanese Patent Application No. 2006-028364 filed on Feb. 6, 2006, which is incorporated herein by reference in its entirety.

BACKGROUND OF THE INVENTION

1. Technical Field

The present invention relates to an image-capturing apparatus such as a digital camera or the like, and more particularly to an image-capturing apparatus having a plurality of optical systems for capturing an image of a scene.

2. Related Art

Many current digital cameras have a zoom lens and a single image sensor and capture a still image and a motion picture. The thus-captured image is digitally processed to thus create a digital image file, and the thus-created film is stored in memory in the digital camera. The digital image file is then transferred to a computer to be displayed thereon or to a printer to be printed thereby.

Desired specifications of a digital camera include compactness and a wide range of an optical zoom. The user prefers a zoom range which is wider than a limited zoom range. However, when the digital camera is provided with a lens of wide zoom range without sacrificing the quality of a captured image, the digital camera becomes bulky. A camera, as in the case of a single lens reflex camera which enables replacement of large lenses, enables use of a plurality of replacement lenses; e.g., a 28 mm to 70 mm zoom lens and a 70 mm to 210 mm zoom lens. However, a compact digital camera does not enable replacement of lenses.

Some digital cameras use a single lens and a plurality of image sensors for the purpose of generating a single color image. Light from a subject is split into a plurality of colors by means of a prism beam splitter. A plurality of monochrome image sensors are used for capturing R, G, B color images.

A stereoscopic-film camera and a stereoscopic digital camera have hitherto been known. Each of these cameras has two lenses of identical focal length which are horizontally spaced apart from each other. Images—which differ slightly from each other in terms of a scene—are formed in two frames of a film or on two image sensors. The two images form a so-called stereoscopic pair. The two lenses are designed so as to exhibit the same scaling factor; and are concurrently used to thus create an image for the left eye and another image for the right eye on an image sensor in order to achieve a stereoscopic effect.

In order to achieve a wide zoom range without replacement of a lens, the compact digital camera is equipped with a plurality of lenses having different focal lengths. Selection of a lens is performed depending on a zoom position. When a camera is equipped with two lenses of different focal lengths, the method of setting focal lengths of the two lenses and the method of switching between the two lenses become important. The reason for this is that the digital camera enables performance of an electronic zooming function of electronically zooming in with respect to digital image data as well as an optical zooming function.

Japanese Patent Laid-Open Publication No. Hei 10-42183 describes a camera having a single lens and a single image sensor, wherein an angle of view is determined by means of driving an electronic zoom and an optical zoom, and the proportion of the optical zoom is increased while the angle of view is maintained.

Japanese Patent Laid-Open Publication No. 2003-283910 describes a camera having an optical finder and an electronic finder, wherein, when switching between the optical finder and the electronic finder is effected as required; namely, when the electronic finder is switched to the optical finder, a lens of the optical finder system is actuated in synchronism with an image-capturing lens in such a way that the angle of view of the lens of the optical finder coincides with the angle of view of the image-capturing lens.

The respective related-art techniques relate to the cameras, each of which has a single lens and a single image sensor. None of these cameras are a camera system having a plurality of optical systems for capturing a scene. Consequently, as a matter of course, the method of switching among the plurality of optical systems is not disclosed.

A digital camera is assumed to have a fixed focal-length lens and a zoom lens, as two lenses. Switching between the two lenses is assumed to be performed as follows. Specifically, a focal length gap between the focal length of the fixed focal-length lens and the minimum focal length of the zoom lens is interpolated by electronic zooming of a digital image captured by the fixed focal-length lens. The camera is equipped with zoom setting means (a zoom button) used for setting a zoom position. The user sets the zoom setting means to a wide position or a telephotography position, to thereby be able to capture an image at a desired zoom position. When the user has set the zoom setting means, which is provided in the camera, to the "telephotography" position, the digital image captured by the fixed focal-distance lens is electronically zoomed in. At a point in time when the telephotography end of the electronic zoom has been attained, the lens is switched to a zoom lens. Subsequently, an optical zoom is performed by means of the zoom lens. When the user has set the zoom setting means to the "wide" position by means of actuating the zoom setting means, the digital image acquired by the zoom lens is optically zoomed out. At a point in time when the minimum focal length of the zoom lens has been attained, switching is effected to en electronic zoom of the fixed focal-length lens, and subsequently the fixed focal-length lens is zoomed out.

Additionally, another digital camera is assumed to have zoom lenses as two lenses, and switching between the two lenses is assumed to be performed as follows. Specifically, an image-capturing optical system having a zoom lens of relatively-wide angle of view is taken as a first image-capturing optical system, and another image-capturing optical system having a zoom lens of relatively-narrow angle of view is taken as a second image-capturing optical system. In an initial state where power is active, both the first image-capturing optical system and the second image-capturing optical system are situated at the wide position. When the user sets the zoom setting means to the "telephotography" position, the first image-capturing optical system is actuated from the wide position toward the telephotography position, to thus perform zooming-in action. Upon arrival at the telephotography position, the first image-capturing optical system is switched to the second image-capturing optical system. Subsequently, the second image-capturing optical system is actuated from the wide position to the telephotography position, to thus perform zoom-in action. When the user has set the zoom operation means to the "wide" position by means of actuating the same, the second image-capturing optical system is actuated from the telephotography position to the wide position, to thus effect zoom-out action. Upon arrival at the wide position, the second image-capturing optical system is switched to the first image-capturing optical system. Subsequently, the first image-capturing optical system is actuated from the telephotography position to the wide position, to thus effect zoom-out action.

However, in the configuration where the first and second image-capturing optical systems are sequentially actuated from the wide position to the telephotography position, consumption of a certain period of time is required before the system arrives at the telephotography position; namely, the second image-capturing optical system arrives at the telephotography position. This may result in a case where the chance to activate a shutter is lost. There may also be a case where some users desire to move the second image-capturing optical system to the telephotography position immediately after power-on. Such a user's demand cannot be met by the above driving methods.

The present invention has been conceived in view of the above drawbacks, and provides an image-capturing apparatus having a plurality of optical systems, which can immediately provide a user's desired arbitrary angle of view and an angle of view frequently used by the user, such as a wide position or a telephotography position.

SUMMARY OF THE INVENTION

The present invention provides an image-capturing apparatus having a plurality of image-capturing systems which can be individually changed in terms of an angle of view and which differ from each other in terms of a range where the angle of view is changed; means for selecting one from the plurality of image-capturing systems and rendering the selected image-capturing system operative; and means for changing an angle of view of the operative image-capturing system in accordance with an external input, wherein each of the image-capturing systems other than the operative image-capturing system is configured so as to be able to assume a value of a first angle of view outside the range where the angle of view of the operative image-capturing system is changed and a value of a second angle of view adjacent to the range where the angle of view of the operative image-capturing system is changed; and the image-capturing apparatus further comprises switching means for switching the angle of view of each of the image-capturing systems other than the operative image-capturing system between the value of the first angle of view and the value of the second angle of view, in accordance with a setting of the angle of view of the operative image-capturing system made by the changing means.

In an embodiment of the present invention, the switching means switches the angle of view of each of the image-capturing systems other than the operative image-capturing system in such a way that the value of the second range of view is assumed when a difference between a set angle of view of the operative image-capturing system and the value of the second angle of view is a predetermined value or less; and in such a way that the value of the first angle of view is taken at other times.

Further, the means for selecting one from the plurality of image-capturing systems and rendering the selected image-capturing system operative switches, to an operative state, the image-capturing system switched to the value of the second angle of view when the difference between the set angle of view of the operative image-capturing system and the value of the second angle of view is a predetermined value or less, and switches the operative image-capturing system to an inoperative state.

According to the present invention, an angle of view of an image-capturing system other than an operative image-capturing system is switchingly controlled according to an angle of view of the operative image-capturing system, so that prompt switching of an angle of view can be performed.

The invention will be more clearly comprehended by reference to the embodiments provided below. However, the scope of the invention is not limited to these embodiments.

BRIEF DESCRIPTION OF THE DRAWINGS

Preferred embodiments of the present invention will be described in detail by reference to the following figures, wherein:

FIG. 2 is a view for describing operation performed when two optical systems effect zoom-in;

DETAILED DESCRIPTION OF THE INVENTION

An embodiment of the present invention will be described hereunder by reference to the drawings.

Basic Configuration

Figure 1:
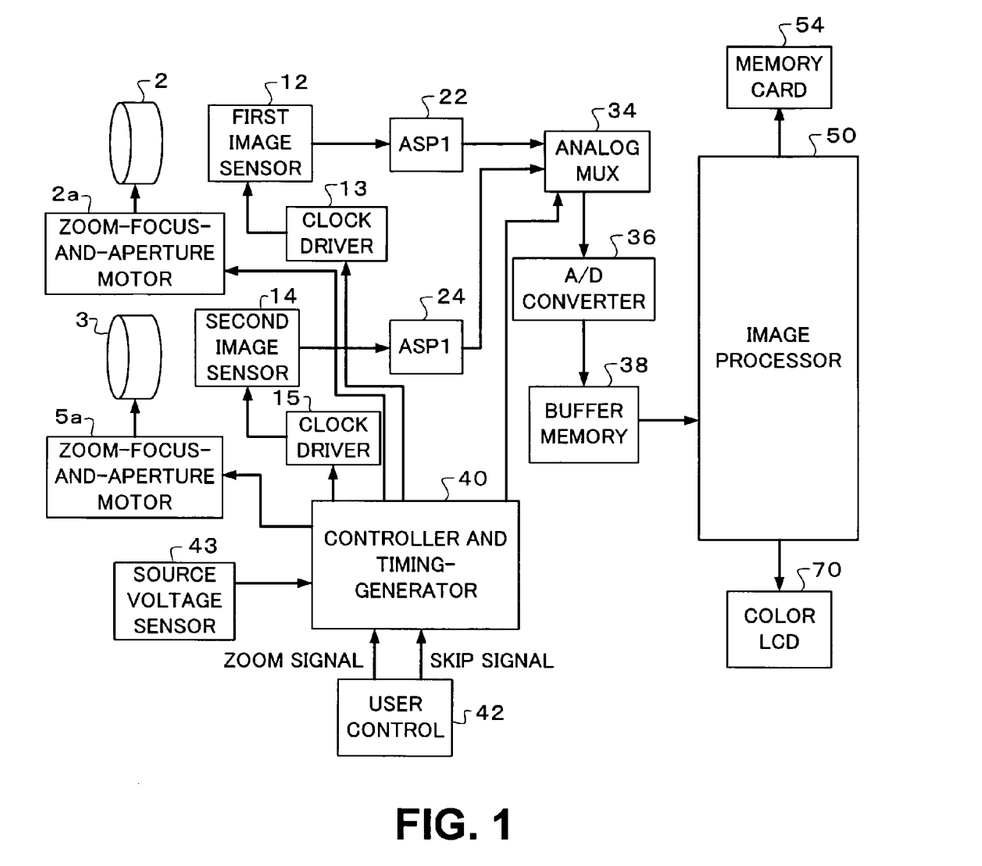
FIG. 1 is a block diagram of an overall digital camera.

FIG. 1 shows a block diagram of the basic configuration of a digital camera according to a present embodiment. A digital camera is a portable, battery-operated camera. The digital camera generates a still digital image stored in a removable memory card 54. In addition to generating a still image, the digital camera may generate a digital motion picture alternatively or concurrently with the still image. The digital motion picture is similarly stored in the memory card 54.

The digital camera includes an image capture assembly. The image capture assembly comprises a first zoom lens 2 for forming an image of a scene on a first image sensor 12 and a second zoom lens 3 for forming an image of the same scene on a second image sensor 14. The image capture assembly provides a first image output from the first image sensor 12 and a second image output from the second image sensor 14. The image sensors 12, 14 are identical with each other in terms of an aspect ratio and a pixel size. The first zoom lens 2 is, e.g., a zoom lens having a 35 mm camera equivalent focal length from 20 mm to 40 mm; and the second zoom lens 3 is, e.g., a zoom lens having a 35 mm camera equivalent focal length from 40 mm to 100 mm.

The first zoom lens 2 is controlled by a zoom-and-focus motor 2a, and includes an aperture-and-shutter assembly for controlling exposure of the image sensor 12. The second zoom lens 3 is driven by a zoom-and-focus motor 5a, and includes an aperture-and-shutter assembly for controlling exposure of the image sensor 14.

The image sensors 12, 14 are single-chip, color megapixel CCD sensors, and employ a known Bayer color filter for use in capturing a color image. The image sensors 12, 14 have a 4:3 image aspect ratio; and 3.1 effective megapixels (2048× 1536 pixels).

A controller and timing-generator 40 supplies a signal to a clock driver 13 to thus control the first image sensor 12; and supplies a signal to a clock driver 15 to thus control the second image sensor 14. The controller and timing-generator 40 controls flash light used for illuminating a scene, as well as controlling the zoom-and-focus motors 2a, 5a. A user control 42 is used for controlling operation of the digital camera. The user control 42 has zoom buttons; for example, a "wide" button and a "telephotograph" button. When performing zoom-in operation, the user operates the "telephotograph" button. In contrast, when performing zoom-out operation, the user operates the "wide" button. The user control 42 has a skip button used for momentarily, discontinuously changing the angle of view to the telephotography position or the wide position of the system. The skip button may be provided separately from the zoom buttons or may double as the zoom buttons. When the skip button doubles as the zoom buttons, the skip button is embodied in such a way that, for example, the zoom button can be depressed in two steps. By means of depressing action of the first step, ordinary continuous zoom-in or zoom-out operation is performed. By means of depressing action of the second step, the angle of view can be instantaneously changed to the telephotography position or the wide position. The controller and timing-generator 40 controls the motors 2a, 5a in accordance with a zoom signal (a zoom button operation signal) from the user control 42 and a skip signal from the skip button, thereby synchronously controlling the angle of view of the first zoom lens 2 and that of the second zoom lens 3.

An analog signal output from the first image sensor 12 is subjected to processing, such as correlation double sampling and like, and amplification in a first analog signal processor (ASP1) 22, and the thus-amplified signal is supplied to a first input terminal of an analog multiplexer (analog MUX) 34. A second analog signal output from the second image sensor 14 is subjected to processing, such as correlation double sampling and like, and amplification in a second analog signal processor (ASP2) 24, and the thus-amplified signal is supplied to a second input terminal of the analog MUX 34. The function of the analog MUX 34 is to select the first sensor output from the first image sensor 12 or the second sensor output from the second image sensor 14. Thereby, the selected sensor output delivered from the image capturing assembly is supplied to a component in a subsequent stage.

The controller and timing-generator 40 controls the analog MUX 34 for supplying either the output from the first analog signal processor (ASP1) 22 or the output from the second analog signal processor (ASP2) 24 to an analog-to-digital (A/D) converter circuit 36. The digital data supplied from the A/D converter circuit 36 is stored in DRAM buffer memory 38, and are processed by an image processor 50. Processing performed by the image processor 50 is controlled by a control program stored in firmware memory formed from flash EPROM memory.

There may also be adopted another configuration where the two A/D converter circuits are connected to an output terminal of the first analog signal processor (ASP1) 22 and an output terminal of the second analog signal processor (ASP2) 24, respectively. In this case, the analog MUX 34 becomes obviated. A digital multiplexer is used in place of the analog MUX for selecting any of the outputs from the A/D converter circuits.

The digital image file processed by the image processor 50 is stored in the removable memory card 54. The removable memory card 54 is one type of digital image storage medium and can be used in some different physical formats. The memory card 54 can be applied to a known standard; e.g., Compact Flash (Registered Trademark) or the like. Other formats; e.g., a magnetic hard drive, a magnetic tape, an optical disk, and the like, can also be used. Alternatively, the digital camera may also use built-in nonvolatile memory such as flash EPROM and the like.

The image processor 50 implements various image processing functions. The functions include color interpolation for generating RGB image data through color and tone correction. The RGB image data are then subjected to JPEG compression and stored as JPEG image data into the memory card 54. The JPEG image data can be supplied to a host PC, as well, by means of a host interface such as a SCSI connection, a USB connection, a FireWire connection, and the like. A so-called "Exif" image format is used for the JPEG file.

The image processor 50 is a typical programmable image processor, but may be a mixture of a hard-wired custom integrated circuit processor, a general-purpose microprocessor, a hard-wired custom IC, and a programmable processor.

The image processor 50 also generates a low-resolution thumbnail image. After capture of an image, a thumbnail image is displayed on a color LCD 70. A graphical user interface appearing on the color LCD 70 is controlled by the user controller 42.

The image capture assembly may be an integrated assembly including the lenses 2, 3; the image sensors 12, 14; and the zoom-and-focus motors 2a, 5a. In addition, the clock drivers 13, 15; the analog signal processors 22, 24; the analog MUX 34; and the A/D converter circuit 36 may also be incorporated as portions of the integrated assembly.

In FIG. 1, the clock drivers 13, 15 are provided for each of the image sensors 12, 14, but the image sensors 12, 14 may share a single clock driver. Further, a single ASP may be employed in lieu of the ASPs 22, 24.

Figure 2:
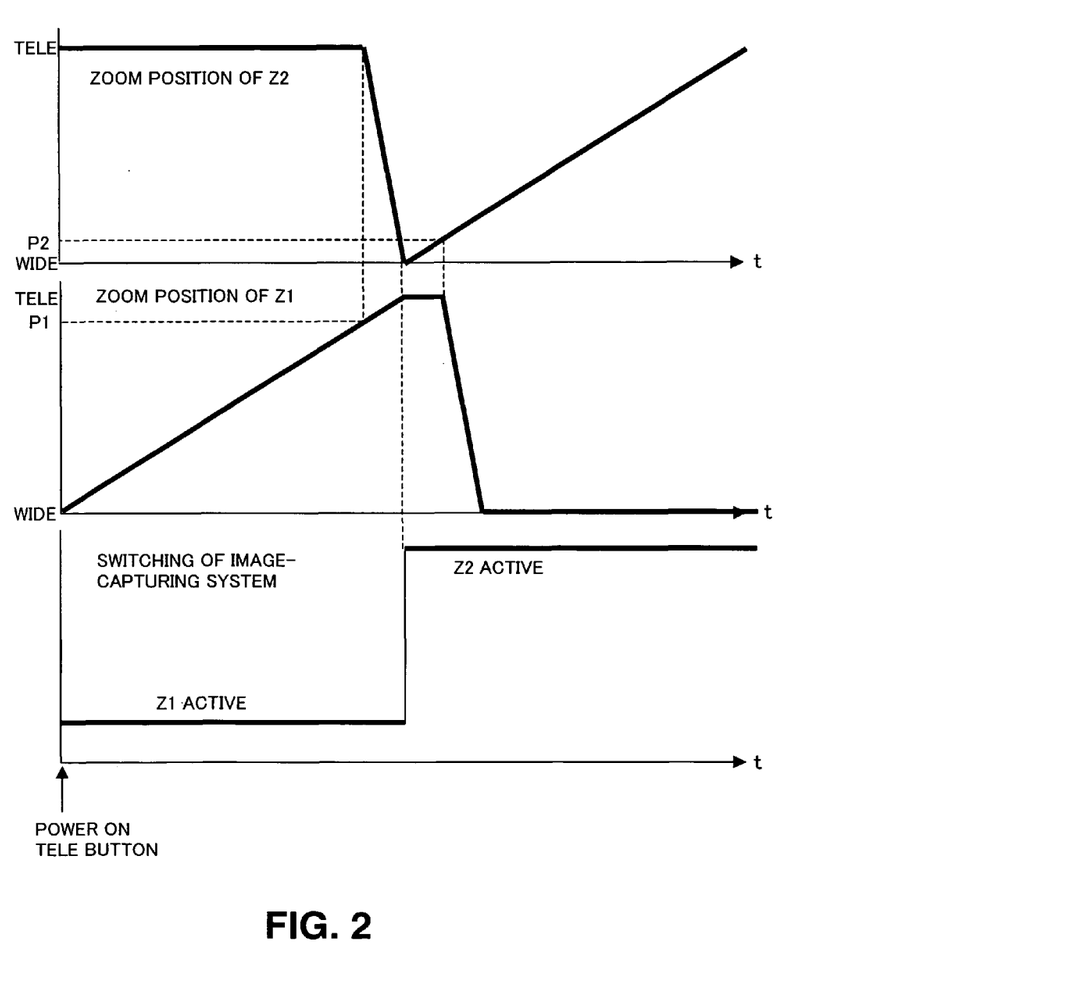

FIG. 2 shows control of the angle of view of the first zoom lens 2 and the angle of view of the second zoom lens 3 performed by the controller and timing-generator 40. This corresponds to a case where the user sets the zoom button of the user control 42 to the "telephotograph" position to thus effect zoom-in. In the drawing, the horizontal axis represents time (t), whereas the vertical axis represent angle of view (the zoom position) of the first zoom lens (simply abbreviated as Z1) 2 and angle of view (the zoom position) of the second zoom lens (simply abbreviated as Z2) 3. The angle of view Z1 changes from the first wide position (WIDE 1) to the first telephotograph position (TELE 1), and the angle of view of Z2 changes from the second wide position (WIDE 2) to the second telephotograph position (TELE 2). In the present embodiment, the first telephotograph position and the second telephotograph position assume the same angle of view. Moreover, the drawing shows an optical system which becomes active (i.e., displayed on the LCD 70) when selected by the analog MUX 34.

In the initial state where power is active, Z1 is set to the first wide position (WIDE 1), and Z2 is set to the second telephotograph position (TELE 2). The reason why Z2 is set to the second telephotograph position is that the zoom lens can be momentarily shifted to the angle of view for a telephotography zoom when the user has operated the skip button. It can also be said that, in preparation for a case where the user desires quick shifting of the zoom lens to the angle of view for a telephotography zoom, Z2 stays in advance in a standby condition at the second telephotograph position (TELE 2).

When the user presses the "telephotograph" zoom button after power-on, Z1 is actuated from the first wide position (WIDE 1) to the first telephotograph position (TELE 1) in response to pressing action. In the meantime, Z2 is maintained in the second telephotograph position (TELE 2) regardless of pressing operation. When the zoom position has reached a first threshold position P1, where the angle of view is wider than that achieved at the first telephotograph position (TELE 1) by a predetermined angle of view, Z2 starts being actuated at high speed from the second telephotograph position to the second wide position (WIDE 2). The instant Z1 has reached the first telephotograph position (TELE 1), Z2 also reaches the second wide position (WIDE 2). An image signal from Z1 is switched from an active state to an inactive state by means of the controller and timing-generator 40. Instead, an image signal from Z2 is switched from an inactive state to an active state. Specifically, the first telephotograph position=the second wide position is taken as a changeover zoom position. When the zoom position has reached the changeover zoom position, the image signal from Z1 is switched to the image signal from Z2, and the image signal from Z2 is output. When the user keeps pressing the zoom button in the telephotograph position in this state, Z1 is maintained in the first telephotograph position (TELE 1), and Z2 is actuated from the second wide position (WIDE 2) to the second telephotograph position (TELE 2). When the zoom position has reached the second threshold position which is narrower than the second wide position (=the first telephotograph position) by a predetermined angle of view, Z1 starts being actuated at high speed from the first telephotograph position (TELE 1) to the first wide position (WIDE 1). Z1, in due course, reaches the first wide position (WIDE 1), and Z2 reaches the second telephotograph position (TELE 2), whereupon optical zoom-in operation is completed. When the user further keeps pressing the telephotograph button, the camera shifts to an electronic zoom operation where an image signal produced by Z2 is electronically zoomed in.

As mentioned above, in the present embodiment, (1) In an initial state where power is active, Z1 is controlled so as to reach the first wide position, and Z2 is controlled so as to reach the second telephotograph position.

(2) Z2 starts being actuated at high speed, at a location which is closer by a predetermined value to the wide angle position than to the zoom position where Z1 is switched to Z2, from the second telephotograph position to the second wide position. Z2 is caused to stay at the second wide position.

(3) Z1 starts being actuated at high speed, at a location which is closer by a predetermined value to the narrow angle position than to the zoom position where Z1 is switched to Z2, from the first telephotograph position to the first wide position. Z1 is caused to stay at the first wide position.

Thereby, quick switching to the telephotograph position is enabled. Specifically, during a period of time when zoom-in operation is performed by means of actuating Z1 toward the first telephotograph position, Z2 is situated not at the second wide position but at the second telephotograph position. Hence, even when the user desires shift of the zoom lens to the telephotograph position in this state, an image signal from Z2 located at the second telephotograph position can be acquired by means of switching Z1 to Z2. When Z1 is zoomed in to the zoom position P1 immediately before Z1 reaches the first telephotograph position, the user can be deemed to intend to continuously perform zoom-in operation. Therefore, in order to smoothly switch Z1 to Z2, Z2 is actuated at high speed from the second telephotograph position to the second wide position. Since Z2 starts being actuated immediately before the first telephotograph position (i.e., the wide angle side), Z2 can be caused to stay at the second wide position the instant Z1 reaches the first telephotograph position. The reason why Z1 is not actuated toward the first wide position immediately after Z1 has been switched to Z2 is that there may arise a case where the user desires to press the "wide" zoom button to thus perform zoom-out operation immediately after Z1 has been switched to Z2. Since Z1 stays in the first telephotograph position, Z2 can be smoothly switched to Z1. In the meantime, when Z2 has reached a zoom position P2, the user can be deemed to have the intention of continuously pressing the "telephotograph" button; namely, continuously performing zoom-in operation, and hence Z1 is actuated at high speed from the first telephotograph position to the first wide position. In a case where Z1 has reached the first wide position, the zoom lens can quickly respond to the user's desire even when the user desires instantaneous movement of the zoom lens to the wide position. The digital camera of the present embodiment can be said to be a system which estimates the user's intention by means of setting the zoom positions P1 and P2, and actuates Z1 or Z2 to a predetermined zoom position in accordance with the estimated user's intention to thereby cause the thus-actuated zoom lens stay at that zoom position.

Figure 3:
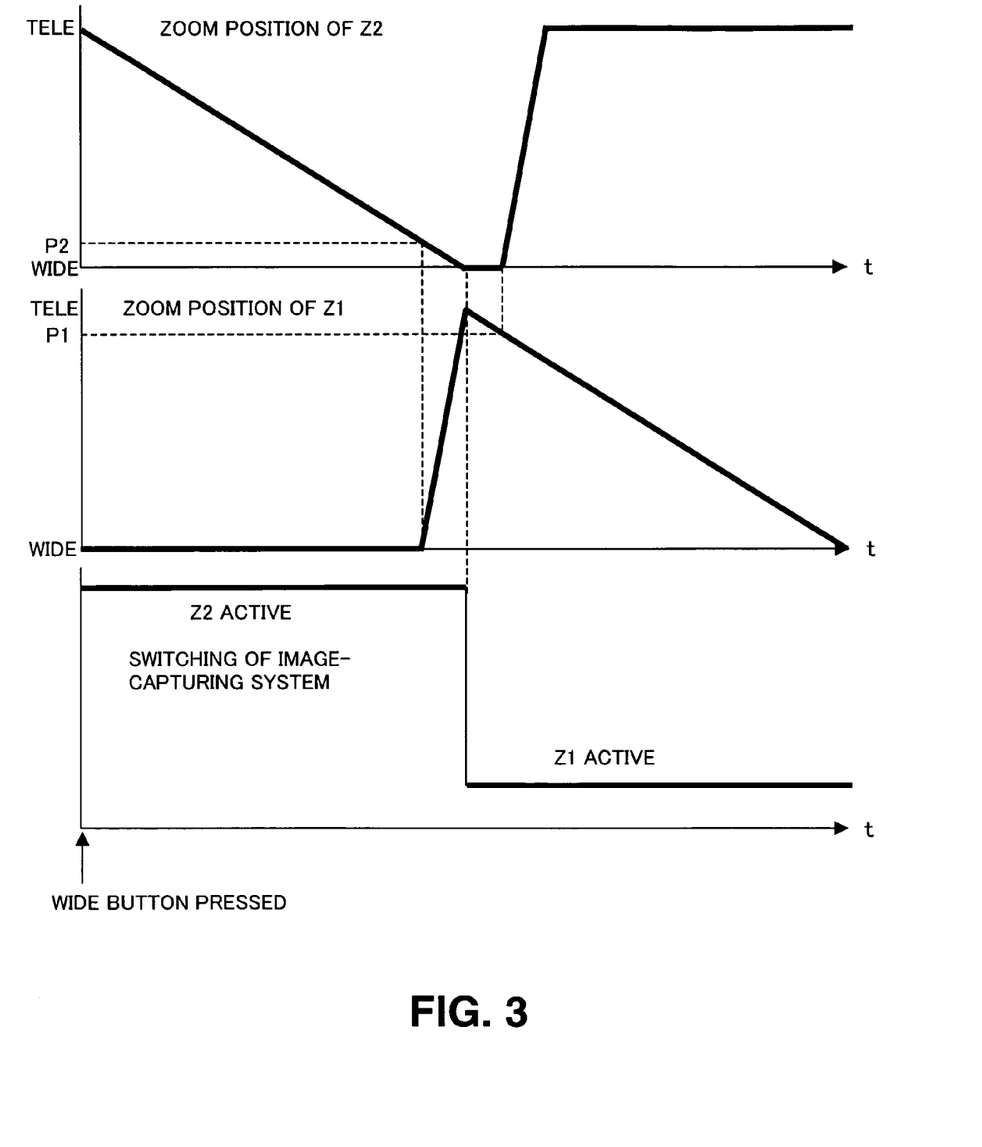
FIG. 3 is a view for describing operation performed when two optical systems effect zoom-out.

FIG. 3 shows the manner in which the controller and timing-generator 40 controls the angle of view of the first zoom lens 2 and that of the second zoom lens 3. This figure illustrates a case where the user presses the wide button of the user control 42 to thus effect zoom-out. When the button is depressed, Z1 is situated at the first wide position (WIDE 1), and Z2 is situated at the second telephotograph position (TELE 2). In accordance with operation of the zoom button, Z2 is actuated from the second telephotograph position (TELE 2) to the second wide position (WIDE 2). During this period, Z1 is maintained at the wide position (WIDE 1). As a result of Z1 being maintained at the first wide position (WIDE 1), the zoom lens can respond to the user's desire even when the user desires quick change of the zoom lens to the wide position. When the angle of view of Z2 has reached the zoom position P2, Z1 starts being actuated at high speed from the first wide position (WIDE 1) to the first telephotograph position (TELE 1). The instant Z2 has reached the second wide position (WIDE 2), Z1 is changed to the first telephotograph position (TELE 1), to thus prepare for switching from Z2 to Z1. In a case where the user still keeps the zoom button in the "wide" position even when Z2 has reached the second wide position (WIDE 2), Z2 is switched to Z1. After the image signal has been switched to the image signal from Z1, Z1 is actuated from the first telephotograph position (TELE 1) to the first wide position (WIDE 1), to thus further effect zoom-out. Meanwhile, Z2 is maintained at the second wide position (WIDE 2). When Z1 has reached the zoom position P1, Z2 starts being actuated at high speed from the second wide position (WIDE 2) to the second telephotograph position (TELE 2) and is changed to the second telephotograph position (TELE 2) and held in a standby condition.

As mentioned above, in the present embodiment, quick switching of the zoom lens to the wide position is made feasible by means of performing the following operations during zoom-out operation.

(1) Z1 starts being actuated at high speed, at a location which is closer by a predetermined value to the narrow angle position than to the zoom position where Z2 is switched to Z1, from the first wide position to the first telephotograph position. Z1 is caused to stay at the first telephotograph position.

(2) Z2 starts being actuated at high speed, at a location which is closer by a predetermined value to the wide angle position than to the zoom position where Z2 is switched to Z1, from the second wide position to the second telephotograph position. Z2 is caused to stay at the second telephotograph position. Specifically, during a period of time when zoom-out operation is performed by means of actuating Z2 toward the second wide position, Z1 is situated not at the first telephotograph position but at the first wide position. Hence, even when the user desires shift of the zoom lens to the wide position in this state, an image signal from Z1 located at the first wide position can be acquired by means of switching Z2 to Z1. When Z2 is zoomed out to the zoom position P2 immediately before Z2 reaches the second wide position, the user can be deemed to intend to continuously perform zoom-out operation. Therefore, in order to smoothly switch Z2 to Z1, Z1 is actuated at high speed from the first wide position to the first telephotograph position. Since Z1 starts being actuated immediately before the second wide position (i.e., the narrow angle side), Z1 can be caused to stay at the first telephotograph position the instant Z2 reaches the second wide position. The reason why Z2 is not actuated toward the second telephotograph position immediately after Z2 has been switched to Z1 is that there may arise a case where the user desires to press the "telephotograph" zoom button to thus perform zoom-in operation immediately after Z2 has been switched to Z1. Since Z2 stays in the second wide position, Z1 can be smoothly switched to Z2. In the meantime, when Z1 has reached the zoom position P1, the user can be deemed to have the intention of continuously pressing the "wide" button; namely, continuously performing zoom-out operation, and hence Z2 is actuated from the second wide position to the second telephotograph position. In a case where Z2 has reached the second telephotograph position, the zoom lens can quickly respond to the user's desire even when the user desires to instantaneous movement of the zoom lens to the telephotograph position.

Figure 4:
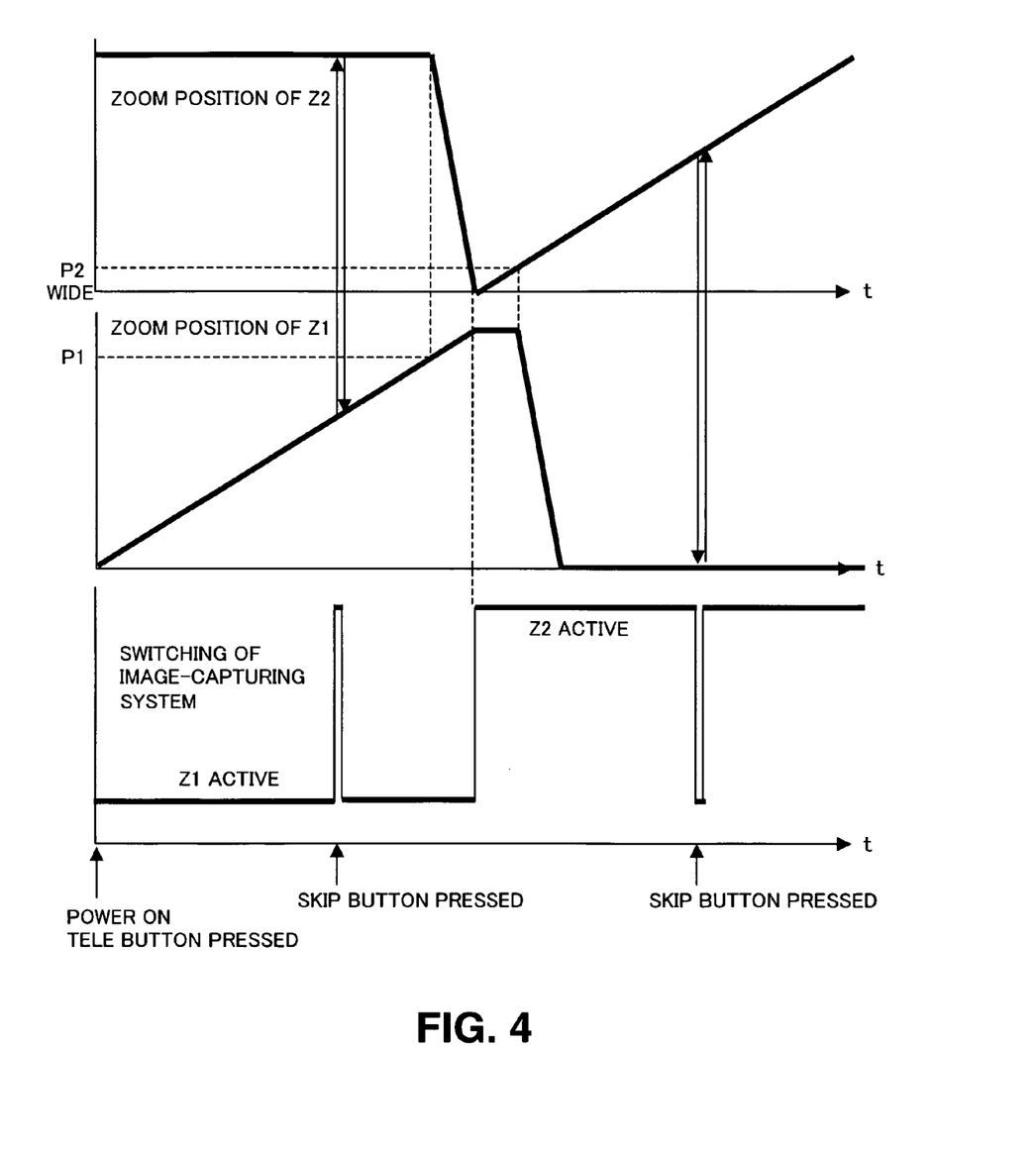
FIG. 4 is a view for describing operation performed when a skip button of the two optical systems is operated.

FIG. 4 shows the manner in which the controller and timing-generator 40 controls the angle of view of the first zoom lens 2 and that of the second zoom lens 3 when the user has operated the skip button (or two-stepped operation of the "telephotograph" zoom button) during the course of zoom-in operation. The basic control operation is the same as that shown in FIG. 2. The user depresses the "telephotograph" zoom button, to thereby actuate Z1 from the first wide position (WIDE 1) to the first telephotograph position (TELE 1), and Z2 is held in the second telephotograph position (TELE 2). When the user operates the skip button toward the telephotograph position before Z1 reaches the zoom position P1, which is a first threshold zoom position, the image signal from Z1 is switched to the image signal from Z2. Since Z2 stays in a standby condition at the second telephotograph position (TELE 2), the user can promptly acquire the angle of view for a telephotography zoom as a result of the image signal from Z1 being switched to the image signal from Z2. When the user operates the skip button toward the wide position the instant Z2 has been actuated from the second wide position (WIDE 2) to the second telephotograph position (TELE 2) and Z2 has exceeded the zoom position P2, which is the second threshold zoom position, the image signal from Z2 is switched to the image signal from Z1. Since Z1 stays at the first wide position (WIDE 1), the user can promptly acquire a wide angle of view as a result of the image signal from Z2 being switched to the image signal from Z1.

The same also applies to a case where zoom-out operation is performed. When the user operates the skip button toward the wide position before Z2 reaches the zoom position P2, which is the second threshold zoom position in FIG. 3, the image signal from Z2 is switched to the image signal from Z1.

Since Z1 stays in a standby condition at the first wide position (WIDE 1), the user can promptly acquire a wide view of angle as a result of the image signal from Z2 being switched to the image signal from Z1. Further, Z1 is actuated from the first telephotograph position (TELE 1) to the first wide position (WIDE 1). When the user operates the skip button toward the telephotograph position the instant Z1 has exceeded the zoom position P1, which is the first threshold zoom position, the image signal from Z1 is switched to the image signal from Z2. Since Z2 stays in the second telephotograph position (TELE 2), the user can promptly acquire the angle of view for a telephotography zoom as a result of the image signal from Z1 being switched to the image signal from Z2.

When the zoom position is interposed between the zoom position P1 and the zoom position P2, neither Z1 nor Z2 is situated at the wide position or the telephotograph position. Hence, during this period of time, processing for disabling or inhibiting operation of the skip button, or the like, is also feasible.

Figure 5:
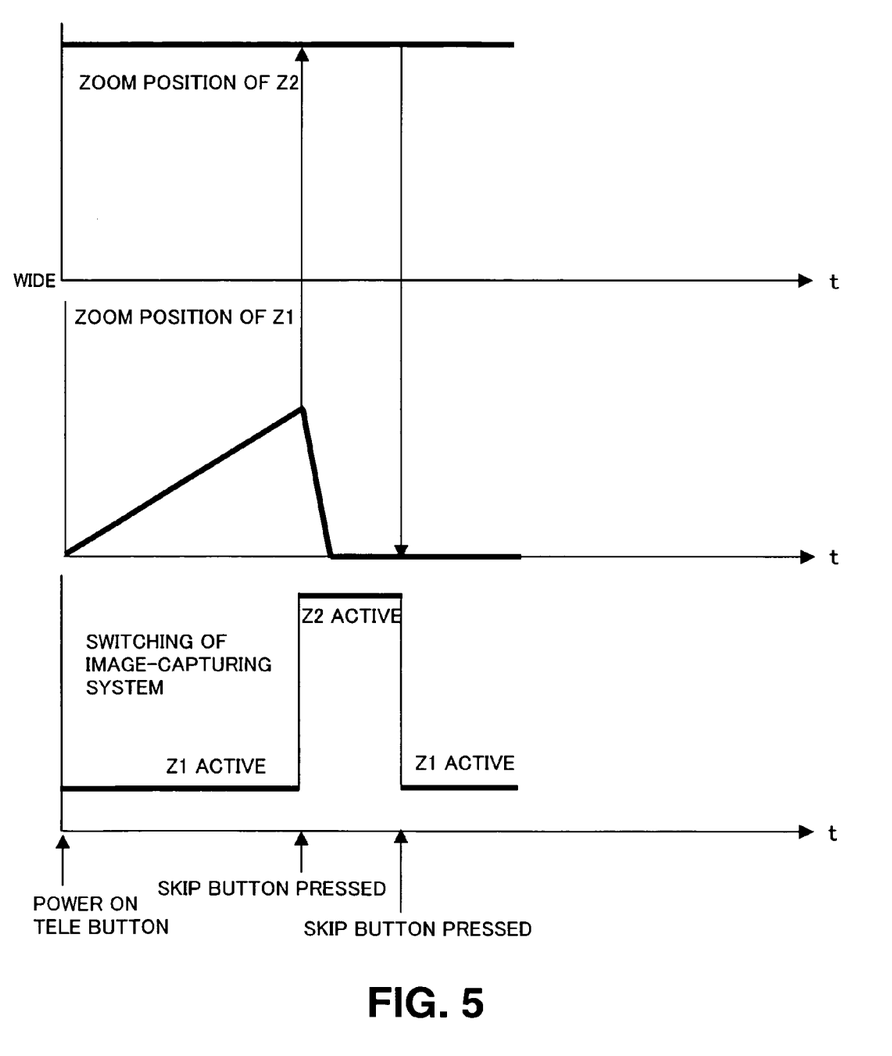
FIG. 5 is a view for describing operation performed when the skip button is actuated during zoom-in of the two optical systems.

FIG. 5 shows another manner of controlling angle of view when skip operation is performed during the zoom-in operation. The user operates the "telephotograph" zoom button to thus actuate Z1 from the first wide position (WIDE 1) toward the second telephotograph position (TELE 2). When the user operates the skip button to the telephotograph position before Z1 reaches the zoom position P1, the image signal from Z1 is switched to the image signal from Z2, and the angle of view achieved when Z2 is situated at the second telephotograph position is obtained. Subsequently, Z1 in an inactive state is actuated at high speed toward the first wide position (WIDE 1) and stays in a standby condition at the first wide position (WIDE 1). When the user again operates the skip button to the wide position after having actuated the skip button to thus switch the image signal from Z1 to the image signal from Z2, the image signal from Z2 is switched to the image signal from Z1. Thus, the angle of view achieved when Z1 is situated at the first wide position is obtained. When the user has again operated the "telephotograph" zoom button in this state, the camera shifts to angle-of-view control operation such as that shown in FIG. 2. When an image is captured, the user performs image-capturing action at the focal length achieved at the wide position of the digital camera and that achieved at the telephotograph position of the same at high frequency. Thus, the ability to make a quick skip to the wide position or the telephotograph position during zoom-in operation results in remarkably-enhanced convenience for the user.

Figure 6:
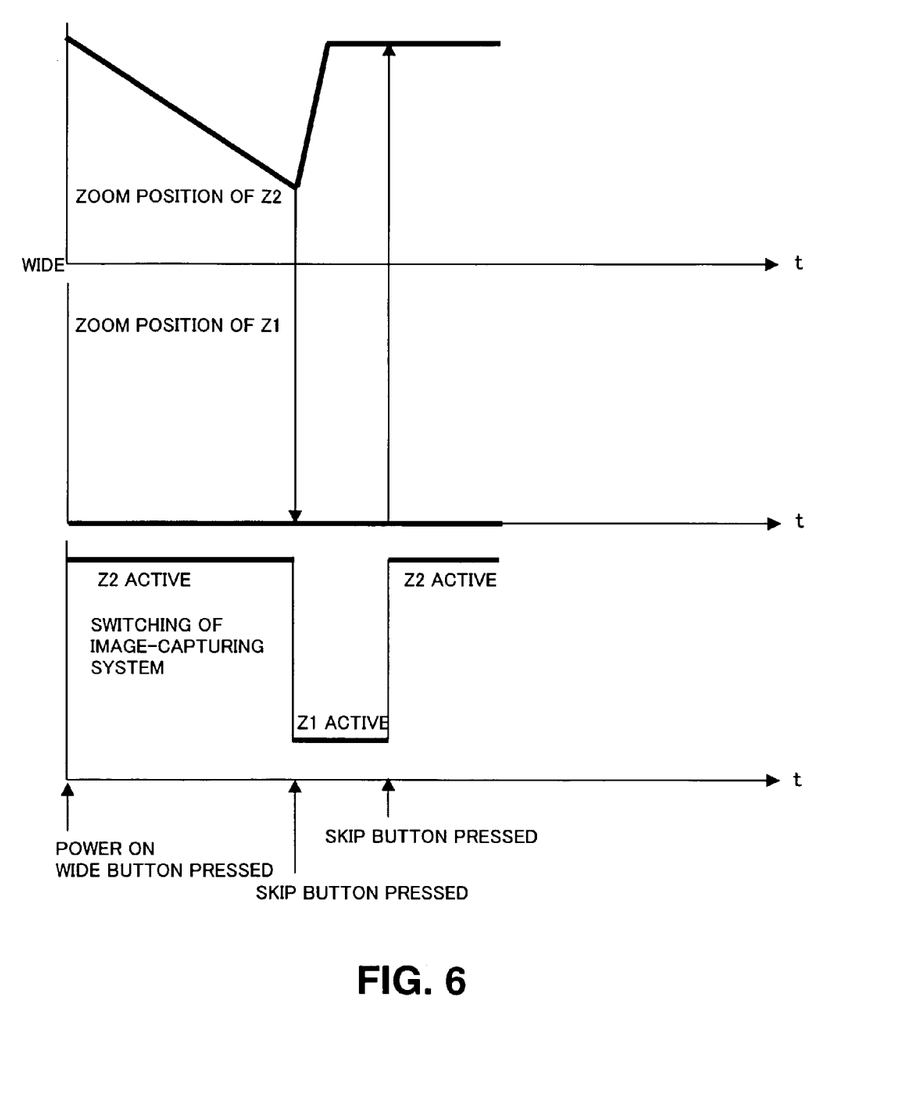
FIG. 6 is a view for describing operation performed when the skip button is actuated during zoom-out of the two optical systems.

FIG. 6 shows another manner of controlling the angle of view when skip operation is performed during the zoom-out operation. The user operates the "wide" zoom button to thus actuate Z2 from the second telephoto position (TELE 2) toward the second wide position (WIDE 2). When the user operates the skip button to the wide position before Z2 reaches the zoom position P2, the image signal from Z2 is switched to the image signal from Z1, and the angle of view achieved when Z1 is situated at the wide position is obtained. Subsequently, Z2 in an inactive state is actuated at high speed toward the second telephotograph position (TELE 2) and stays in a standby condition at the second telephotograph position (TELE 2). When the user again operates the skip button to the telephotograph position after having actuated the skip button to thus switch the image signal from Z2 to the image signal from Z1, the image signal from Z1 is switched to the image signal from Z2. Thus, the angle of view achieved when Z2 is situated at the telephotograph position is obtained. When the user has again operated the "wide" zoom button in this state, the camera shifts to angle-of-view control operation such as that shown in FIG. 3.

Figure 7:
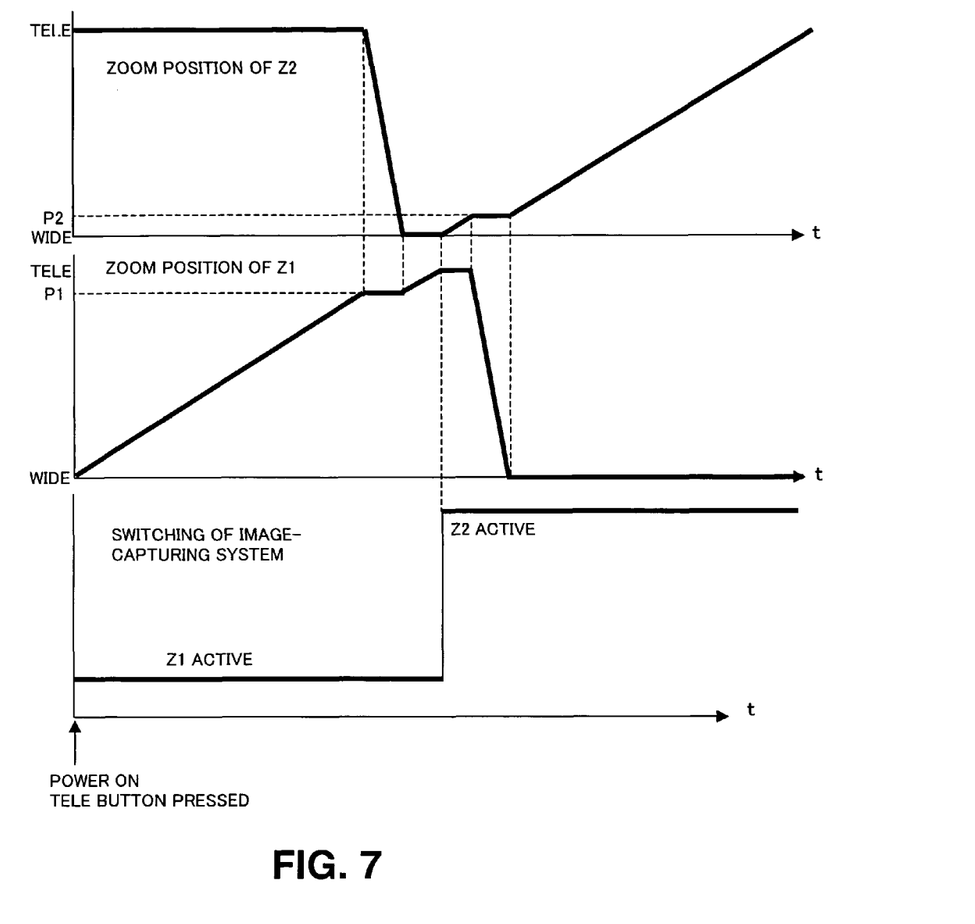
FIG. 7 is another view for describing operation performed during zoom-in of the two optical systems.

FIG. 7 shows still another manner of controlling the angle of view of the first zoom lens 2 and that of the second zoom lens 3 performed by the controller and timing-generator 40. This corresponds to a case where the user sets the zoom button of the user control 42 to the "telephotograph" position to thus effect zoom-in operation and where a power battery is consumed. As shown in FIG. 1, a source voltage sensor 43 detects the voltage of the power battery and supplies a result of detection to the controller and timing-generator 40. On the basis of the detected voltage and the like, the controller and timing-generator 40 determines whether or not the power battery is consumed. When the detected value is a predetermined value or less; namely, when the battery is determined to be consumed, angle-of-view control is switched to that shown in FIG. 7. The angle-of-view control shown in FIG. 7 is basically identical with that shown in FIG. 2, except that Z1 and Z2 are not simultaneously actuated.

Specifically, the instant Z1 has reached the zoom position P1, Z2 starts being actuated from the second telephotograph position (TELE 2) to the second wide position (WIDE 2). At this time, if Z1 is also continuously actuated, both Z1 and Z2 will be actuated, and power consumption will be increased. For this reason, during a period of time in which Z2 is actuated from the second telephotograph position (TELE 2) to the second wide position (WIDE 2), actuation of Z1 is interrupted. In the interim, the angle of view appearing on the LCD 70 is maintained at the zoom position P1. When Z2 is actuated to the second wide position (WIDE 2), Z1 again starts being actuated from the zoom position P1 to the first telephotograph position (TELE 1). When Z1 has reached the first telephotograph position (TELE 1), the image signal from Z1 is switched to the image signal from Z2.

After the image signal from Z1 has been switched to the image signal from Z2, Z2 is actuated from the second wide position (WIDE 2) to the second telephotograph position (TELE 2). The instant Z2 has reached the zoom position P2, Z1 starts being actuated from the first telephotograph position (TELE 1) toward the first wide position (WIDE 1). If actuation of Z2 is continued at this time, power consumption will be increased. For this reason, during a period in which Z1 is actuated from the first telephotograph position (TELE 1) to the first wide position (WIDE 1), actuation of Z2 is interrupted. In the interim, the angle of view appearing on the LCD 70 is maintained at the zoom position P2. When Z1 is actuated to the first wide position (WIDE 1), Z2 again starts being actuated from the zoom position P2 to the second telephotograph position (TELE 2).

As mentioned above, Z1 and Z2 are alternately actuated, to thus avoid simultaneous actuation of Z1 and Z2 (simultaneous driving of the motors 2a, 5a), thereby reducing power consumption at the time of consumption of the power battery.

Figure 8:
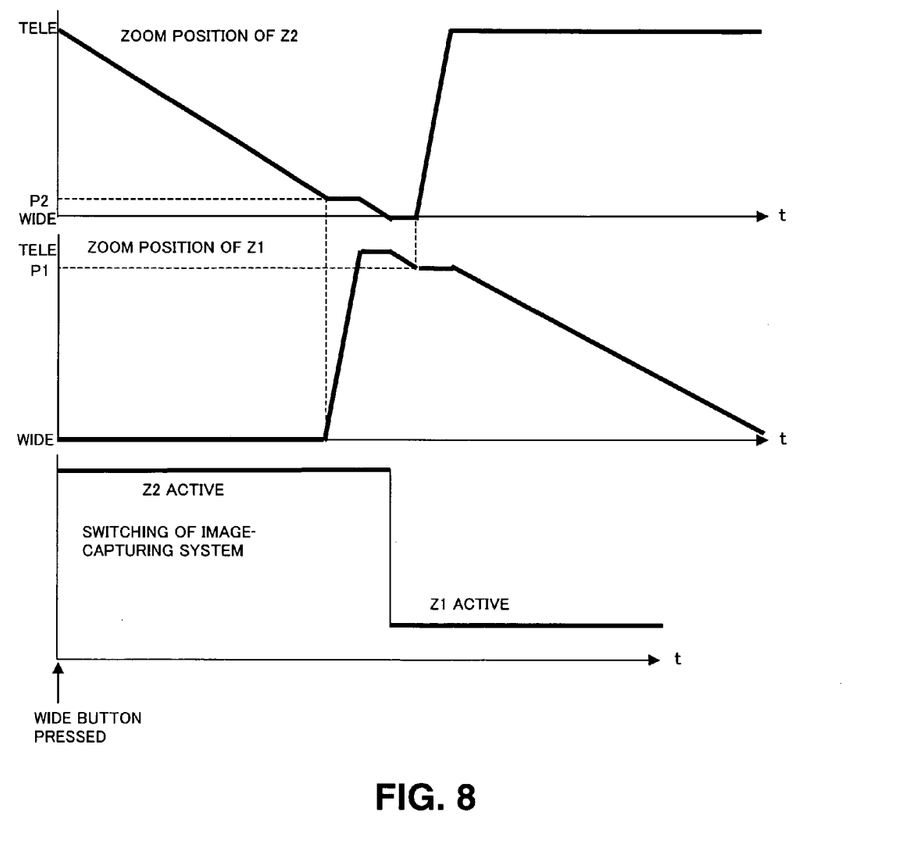
FIG. 8 is another view for describing operation performed during zoom-out of the two optical systems.

FIG. 8 shows still another manner of controlling the angle of view of the first zoom lens 2 and that of the second zoom lens 3 performed by the controller and timing-generator 40. This corresponds to a case where the user sets the zoom button of the user control 42 to the "wide" position to thus effect zoom-out operation and where a power battery is consumed. When the detected value is a predetermined value or less; namely, when the battery is determined to be consumed, the controller and timing-generator 40 switches the angle-of-view control to that shown in FIG. 8. The angle-of-view control shown in FIG. 8 is basically identical with that shown in FIG. 3, except that Z1 and Z2 are not simultaneously actuated.

Specifically, Z1 starts being actuated the instant Z2 has reached the zoom position P2. However, during a period of time in which Z1 is actuated from the first wide position (WIDE 1) to the first telephotograph position (TELE 1), actuation of Z2 is interrupted. In the interim, the angle of view appearing on the LCD 70 is maintained at the zoom position P2. When Z1 has reached the first telephotograph position (TELE 1), actuation of Z2 is resumed. When Z2 has reached the second wide position (WIDE 2), the image signal from Z2 is switched to the image signal from Z1.

After the image signal from Z2 has been switched to the image signal from Z1, Z1 is actuated from the first telephotograph position (TELE 1) to the first wide position (WIDE 1). The instant Z1 has reached the zoom position P1, Z2 starts being actuated from the second wide position (WIDE 2) toward the second telephotograph position (TELE 2). During the period of actuation of Z2, actuation of Z1 is interrupted. After Z2 has been actuated to the second telephotograph position (TELE 2), actuation of Z1 is resumed.

The embodiment of the present invention has been described by reference to the case the digital camera has the two image-capturing optical systems. However, the present invention is not limited to this embodiment. The present invention can also be applied to a digital camera having three or more image-capturing optical systems.

Figure 9:
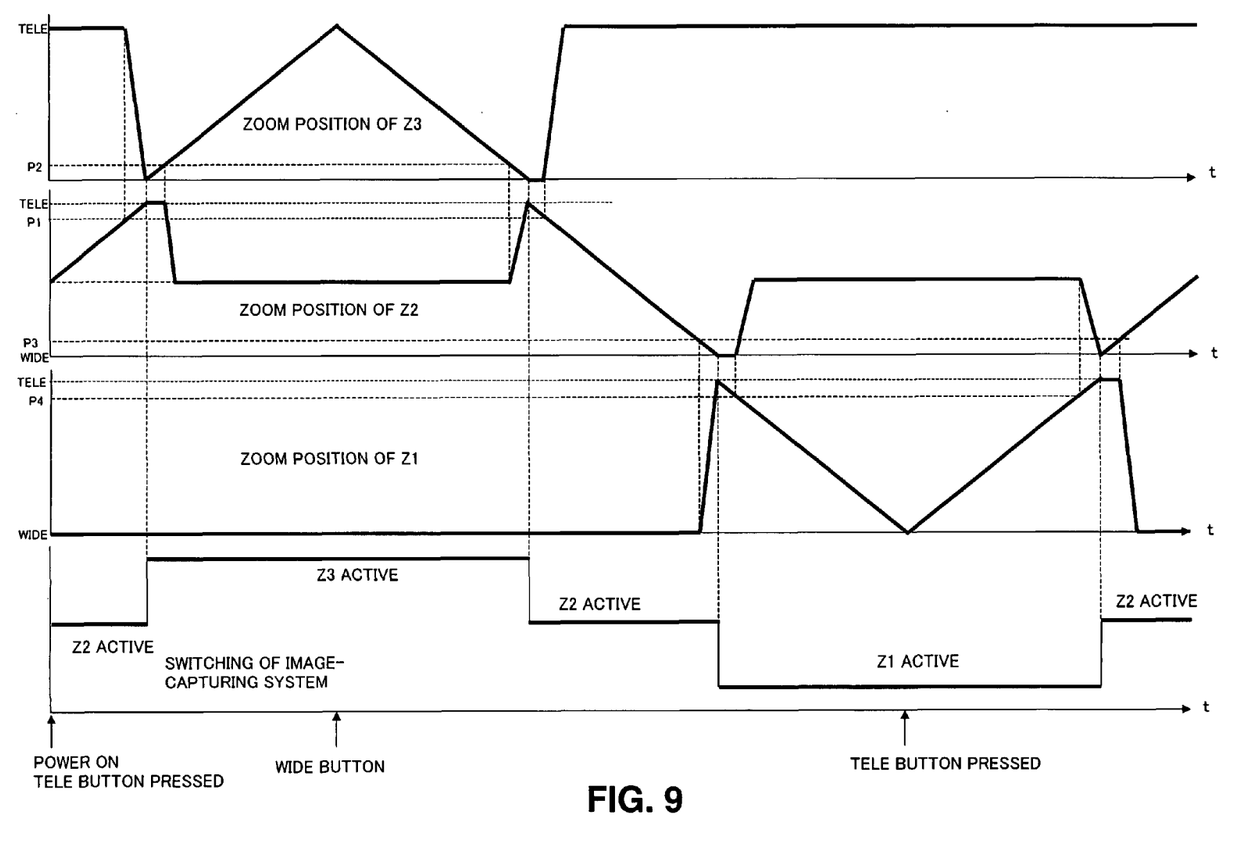
FIG. 9 is a view for describing operation of three optical systems.

FIG. 9 shows the manner of controlling angles of view of a digital camera having three zoom lenses (called Z1, Z2, and Z3). The angle of view of the wide zoom lens Z1 changes from the first wide position to the first telephotograph position; the angle of view of the standard zoom lens Z2 changes from the second wide position to the second telephotograph position; and the angle of view of the telephotography zoom lens Z3 changes from a third wide position to a third telephotograph position. For instance, Z1 has a 35 mm camera equivalent focal length from 20 mm to 40 mm; Z2 has a 35 mm camera equivalent focal length from 40 mm to 100 mm; and Z3 has a 35 mm camera equivalent focal length from 100 mm to 400 mm.

In an initial state where power is active, Z1 is controlled so as to be situated at the first wide position; Z2 is controlled so as to be situated at an intermediate position between the second wide position and the second telephotograph position; Z3 is controlled so as to be situated at the third telephotograph position; and Z2 becomes active. Specifically, an image signal from Z2 is output. When the user sets the zoom button to the "telephotograph" position in this state, the controller and timing-generator 40 actuates Z2 toward the second telephotograph position, to thus effect zoom-in. Z1 and Z3 are not actuated. When Z2 has reached the zoom position P1, Z3 starts being actuated from the third telephotograph position toward the third wide position. When Z2 has reached the second telephotograph position, the image signal from Z2 is switched to an image signal from Z3. When the battery is consumed, actuation of Z2 may be interrupted during the period of actuation of Z3. When the user further sets the zoom button to the "telephotograph" position after the image signal from Z2 has been switched to the image signal from Z3, Z3 is actuated from the third wide position to the third telephotograph position. In the interim, Z2 is maintained at the second telephotograph position. When Z3 has reached the zoom position P2, Z2 starts being actuated toward the second wide position. When the battery is consumed, actuation of Z3 may be interrupted during the course of actuation of Z2.

When the user sets the zoom button to the "wide" position after Z3 has reached the third telephotograph position, Z3 is actuated toward the third wide position, to thus effect zoom-out. In the interim, Z1 and Z2 are not actuated. When Z3 has reached the zoom position P2, Z2 starts being actuated toward the second telephotograph position. When Z3 has reached the third wide position, the image signal from Z3 is switched to the image signal from Z2. After the image signal from Z3 has been switched to the image signal from Z2, Z2 is actuated toward the second wide position, to thus further effect zoom-out. When Z2 has reached the zoom position P1, Z3 starts being actuated toward the third telephotograph position. When the battery is consumed, actuation of Z2 may be interrupted during the period of actuation of Z1. When Z2 has reached a zoom position P3, which is the third threshold zoom position, Z1 starts being actuated from the first wide position toward the first telephotograph position. When Z2 has reached the second wide position, the image signal from Z2 is switched to the image signal from Z1. After the image signal from Z2 has been switched to the image signal from Z1, Z1 starts being actuated from the first telephotograph position toward the first wide position. Z2 is maintained at the second wide position. When Z1 has reached a zoom position P4, which is a fourth threshold zoom position, Z2 starts being actuated from the second wide position toward the initial angle of view; namely, the intermediate position between the second wide position and the second telephotograph position. When Z2 has reached the initial angle of view, the angle of view is maintained.

When the user sets the zoom button to the "telephotograph" position after Z1 has reached the first wide position, Z1 is actuated from the first wide position toward the first telephotograph position. Z2 and Z3 are not actuated. When Z1 has reached the zoom position P4, Z2 starts being actuated from the initial angle of view toward the angle of view for the second wide zoom. When the battery is consumed, actuation of Z1 may be interrupted during the period of actuation of Z2. When Z1 has reached the first telephotograph position, the image signal from Z1 is switched to the image signal from Z2. After the image signal from Z1 has been switched to the image signal from Z2, Z2 starts being actuated toward the second telephotograph position, to thus further effect zoom-in. When Z2 has reached the zoom position P3, Z1 starts being actuated toward the first wide position.

The relationship between the zoom positions P3, P4 and the first telephotograph position (=the second wide position) is equivalent to the relationship between the zoom positions P1, P2 and the second telephotograph position (=the third wide position). Namely, the zoom position P3 is set to a wide angle side rather than to the first telephotograph position. The zoom position P4 is set to a narrow angle side rather than to the first telephotograph position.

Even in the three optical systems, when the skip button is operated, the two optical systems can be actuated similarly. For example, when the skip button is actuated to the telephotograph position during the course of Z2 effecting zoom-in operation, the active lens is switched from Z2 to Z3. Further, Z2 is actuated at high speed to a default position; namely, the intermediate position between the second wide position and the second telephotograph position. Further, when the skip button is actuated toward the telephotograph position during the course of Z1 effecting zoom-in operation, the active lens is switched from Z1 to Z3, and Z1 is actuated to the first wide position at high speed. The active lens may be switched from Z1 to Z2. In the meantime, when the skip button is actuated to the wide position during the course of Z3 effecting zoom-out operation, the active lens is switched from Z3 to Z1, and Z3 is actuated at high speed up to the third telephotograph position. In this case, the active lens may be switched from Z3 to Z2. The skip button itself may be embodied as a button which can be operated in two steps. By means of operation of the button in the first step, the active lens may be switched to a zoom lens which is adjacent to the active lens in terms of the angle of view (e.g., from Z2 to Z3 or Z1 to Z2). By means of operation of the button in the second step, the active lens may be switched to the zoom lens which is most distant from the active lens in terms of the angle of view (e.g., Z1 to Z3 or Z3 to Z1).

In the present embodiment, the zoom positions P1, P2, P3, and P4 may be fixed to default values. The user may be able to adjust the zoom positions, as required. The zoom positions P1, P2, P3, and P4 may be changed according to a subject or a photographic scene mode. For instance, when a landscape is photographed, P1 and P2 may be changed so as to depart from the second telephotograph position (=the third wide position), and P3 and P4 may be changed so as to depart from the first telephotograph position (=the second wide position).

PARTS LIST 2 first zoom lens
2a zoom-focus motor
3 second zoom lens
5a zoom-focus motor
12 first image sensor
13 clock driver
14 second image sensor
15 clock driver
22 first analog signal processor (ASP1)
24 second analog signal processor (ASP2)
34 analog multiplexer (analog MUX)
36 analog-to-digital (A/D) converter circuit
38 DRAM buffer memory
40 controller and timing generator
42 user control
43 source voltage sensor
50 image processor
54 memory card
70 color LCD

The invention claimed is:
1. An image-capturing apparatus comprising:
a plurality of image-capturing systems which can be individually changed in terms of an angle of view and which differ from each other in terms of a range where the angle of view is changed;
selecting mechanism for selecting one from the plurality of image-capturing systems as a first system and rendering the first system operative;
changing mechanism for changing an angle of view of the first system in accordance with an external input; and
switching mechanism for automatically switching an angle of view of a second image-capturing system which is not selected by the selecting mechanism in accordance with the angle of view of the first system, wherein
the switching mechanism sets the angle of view of the second system to a first value within its changing range of the angle of view a difference of which from the changing range of the first system is substantially greatest when a difference between a set angle of view of the first system and the changing range of the angle of view of the second system is greater than a predetermined value; and
sets the angle of view of the second system to a second value within its changing range of the angle of view and substantially closest to the changing range of the angle of view of the first system when a difference between the set angle of view of the first system and the changing range of the angle of view of the second system is the predetermined value or less.

2. The image-capturing apparatus according to claim 1, wherein the selecting mechanism selects an image-capturing system in response to external manual operation.

3. The image-capturing apparatus according to claim 1, wherein the selecting mechanism automatically selects the second image-capturing system and renders the second system operative, when the set angle of view of the first image-capturing system is within or closest to the changing range of the angle of view of the second system, and switches the first image-capturing system to an inoperative state.

* * * * *